(12) United States Patent
Chivukula et al.

(10) Patent No.: US 12,379,937 B2
(45) Date of Patent: Aug. 5, 2025

(54) SYSTEM AND METHOD FOR PROVIDING GLOBAL DATA VALIDATION TOOL

(71) Applicant: JPMorgan Chase Bank, N.A., New York, NY (US)

(72) Inventors: Keerthi Chivukula, Visakhapatnam (IN); Swathi Yenumula, Lingampally (IN); Pawan Kumar, Miyapur (IN); Aswini Mohapatra, Shaikpat (IN); Abdul Subhan Shoukat Ghouse, Hyderabad (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 590 days.

(21) Appl. No.: 17/653,019

(22) Filed: Mar. 1, 2022

(65) Prior Publication Data
US 2023/0229457 A1    Jul. 20, 2023

(30) Foreign Application Priority Data
Jan. 15, 2022 (IN) .............................. 202211002447

(51) Int. Cl.
| | |
|---|---|
| G06F 9/445 | (2018.01) |
| G06F 9/4401 | (2018.01) |
| G06F 9/48 | (2006.01) |
| G06F 9/50 | (2006.01) |
| G06F 11/3668 | (2025.01) |
| G06F 11/30 | (2006.01) |

(52) U.S. Cl.
CPC ............ *G06F 9/445* (2013.01); *G06F 9/4411* (2013.01); *G06F 9/4881* (2013.01); *G06F 11/3672* (2013.01); *G06F 9/5072* (2013.01); *G06F 11/3006* (2013.01)

(58) Field of Classification Search
None
See application file for complete search history.

(56) References Cited

U.S. PATENT DOCUMENTS

| | | | |
|---|---|---|---|
| 6,578,021 B1* | 6/2003 | Barillaud | ................ H04L 41/16 706/20 |
| 10,585,877 B1* | 3/2020 | Casazza | ................... G06F 16/80 |
| 2015/0188945 A1* | 7/2015 | Kjeldaas | ............. G06F 21/6245 726/1 |

(Continued)

*Primary Examiner* — Abu Zar Ghaffari
(74) *Attorney, Agent, or Firm* — GREENBLUM & BERNSTEIN, P.L.C.

(57) ABSTRACT

A method for selective performing a validation in one or more technical operations by a cloud based validation framework is provided. The method includes identifying a job task to be performed, identifying technical operations associated with the job task; receiving user configurable input data for performing validation on at least one technical operation associated with the job task; and submitting the user configurable input data into the cloud network based validation framework. The method further includes determining, by the cloud network based validation framework, at least one technical operation specified for performing a validation function among the technical operations; generating a dictionary file for the at least one technical operation specified for performing the validation function; and performing the validation function specified by the dictionary file.

14 Claims, 7 Drawing Sheets

(56) References Cited

U.S. PATENT DOCUMENTS

| | | | |
|---|---|---|---|
| 2015/0281233 A1* | 10/2015 | Asenjo | G06F 21/44 |
| | | | 726/7 |
| 2018/0096020 A1* | 4/2018 | Sreenivasa | G06F 16/958 |
| 2018/0196731 A1* | 7/2018 | Moorthi | G06F 11/3688 |
| 2019/0095320 A1* | 3/2019 | Biswas | G06F 11/3457 |
| 2019/0132350 A1* | 5/2019 | Smith | G06F 21/60 |
| 2019/0179934 A1* | 6/2019 | Gogineni | G06F 3/04842 |
| 2019/0213104 A1* | 7/2019 | Qadri | H04L 67/1097 |
| 2019/0318312 A1* | 10/2019 | Foskett | G06F 9/5072 |
| 2021/0192366 A1* | 6/2021 | Kadambi | G06N 5/022 |
| 2021/0303693 A1* | 9/2021 | Polakovic | G06F 8/63 |
| 2021/0358320 A1* | 11/2021 | Douglas | G09B 7/02 |
| 2022/0269654 A1* | 8/2022 | Hiremath | G06N 20/00 |
| 2022/0291953 A1* | 9/2022 | Malvankar | G06F 11/3072 |

* cited by examiner

FIG. 7

| Engine Step | Validation Type | Status | Report |
|---|---|---|---|
| Step 1 | Drop Check | Success | Validation Report type 1 |
| Step 1 | Duplicate Check | Success | Validation Report type 2 |
| Step 2 | Drop Check | Success | Validation Report type 1 |
| Step 2 | Duplicate Check | Success | Validation Report type 2 |
| Step 3 | Drop Check | Success | Validation Report type 1 |
| Step 3 | Duplicate Check | Fail | Validation Report type 2 |

SYSTEM AND METHOD FOR PROVIDING GLOBAL DATA VALIDATION TOOL

CROSS-REFERENCE TO RELATED APPLICATION(S)

This application claims priority benefit from Indian Application No. 202211002447, filed Jan. 15, 2022, which is hereby incorporated by reference in its entirety.

TECHNICAL FIELD

This disclosure generally relates to a system and method of providing a global data verification and validation tool that is centrally accessible by multiple sources, and applied selectively for performing automated verification and validation of data manipulations performed.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Generally, when a job task, such a generation of a forecasting report, is to be performed, multiples of technical operations may be performed. The technical operations may include various data manipulations, which may require various verifications and validations to be performed to ensure that a proper output, such as a report, is generated. However, currently, the necessary verifications and validations operations are coded and integrated directly into the job task to be performed, requiring a large amount of technical resources to be deployed and limits the amount of job tasks that may be performed by an organization.

Further, at least because the verification and validation coding is performed at the job task level, the verification and validation operations may be applied to all of the technical operations associated with performing the respective job task, which may utilize more resources in terms of for example, memory allocation or CPU processing utilization, than necessary.

SUMMARY

According to an aspect of the present disclosure, a method for selectively performing a validation in one or more technical operations by a cloud based validation framework. The method includes identifying a job task to be performed, identifying technical operations associated with the job task, receiving user configurable input data for performing validation on at least one of the technical operations associated with the job task, and submitting the user configurable input data into the cloud network based validation framework. The method further includes having the cloud network based validation framework perform determining at least one technical operation specified for performing a validation function among the technical operations, generating a dictionary file for the at least one technical operation specified for performing the validation function, and performing the validation function specified by the dictionary file.

According to another aspect of the present disclosure, the method further includes generating an output file of the validation function performed for the at least one technical operation.

According to another aspect of the present disclosure, the output file is either in a csv format or a parquet format.

According to yet another aspect of the present disclosure, the user configurable input data specifies the at least one technical operation for performing the validation function.

According to another aspect of the present disclosure, less than all of the technical operations associated with the job task are validated by the cloud network based validation framework.

According to a further aspect of the present disclosure, the user configurable input data is provided as JSON.

According to yet another aspect of the present disclosure, the user configurable input data is modified by the cloud network based validation framework, when submitted to the cloud network based validation framework.

According to a further aspect of the present disclosure, the user configurable input data includes place holders that are replaced with input values corresponding to the at least one technical operation specified for performing the validation function.

According to another aspect of the present disclosure, the validation function includes file check validation by default. One or more of a drop check validation, a duplicate check validation or a custom validation may additionally be performed if required.

According to a further aspect of the present disclosure, the cloud network based validation framework includes a driver, a validator, and an output.

According to a further aspect of the present disclosure, outputs of validation functions performed for all technical operations selected to be applied to the cloud network based validation framework are aggregated and provided as a report.

According to a further aspect of the present disclosure, the user configurable input data is received from a web-based input form.

According to a further aspect of the present disclosure, one or more validation function types are set to be performed on the at least one technical operation.

According to a further aspect of the present disclosure, a sequence of the technical operations and corresponding validations are orchestrated by an on premise scheduler.

According to another aspect of the present disclosure, the cloud network based validation framework is contemporaneously accessible by different technical operations of different job tasks.

According to another aspect of the present disclosure, the dictionary file includes information provided by the user configurable input data, and the user configurable input data specifies one or more validation functions for each technical operation specified to be validated by the cloud network based validation framework.

According to another aspect of the present disclosure, a file check validation is specified as the validation function as a default unless specified otherwise by the dictionary file.

According to another aspect of the present disclosure, the validation function specified in the dictionary file is automatically selected by artificial intelligence.

According to another aspect of the present disclosure, a system includes a processor, a memory, and a communication circuit. The processor is configured to identify a job task to be performed, identify technical operations associated with the job task, receive user configurable input data for performing validation on at least one of the technical operations associated with the job task, submit the user configurable input data into the cloud network based validation framework, determine, via the cloud network based validation framework, at least one technical operation specified for performing a validation function among the technical operations, generate, via the cloud network based validation framework, a dictionary file for the at least one technical operation specified for performing the validation function, and perform, via the cloud network based validation framework, the validation function specified by the dictionary file.

According to another aspect of the present disclosure, a non-transitory computer readable storage medium that stores a computer program for performing a projected graph based prediction, the computer program, when executed by a processor, causing a system to perform a process. The process includes identifying a job task to be performed, identifying technical operations associated with the job task, receiving user configurable input data for performing validation on at least one of the technical operations associated with the job task, and submitting the user configurable input data into the cloud network based validation framework. The method further includes having the cloud network based validation framework perform determining at least one technical operation specified for performing a validation function among the technical operations, generating a dictionary file for the at least one technical operation specified for performing the validation function, and performing the validation function specified by the dictionary file.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 7 illustrates a validation report generated by a GDVT system in accordance with an exemplary embodiment.

DETAILED DESCRIPTION

Figure 1:
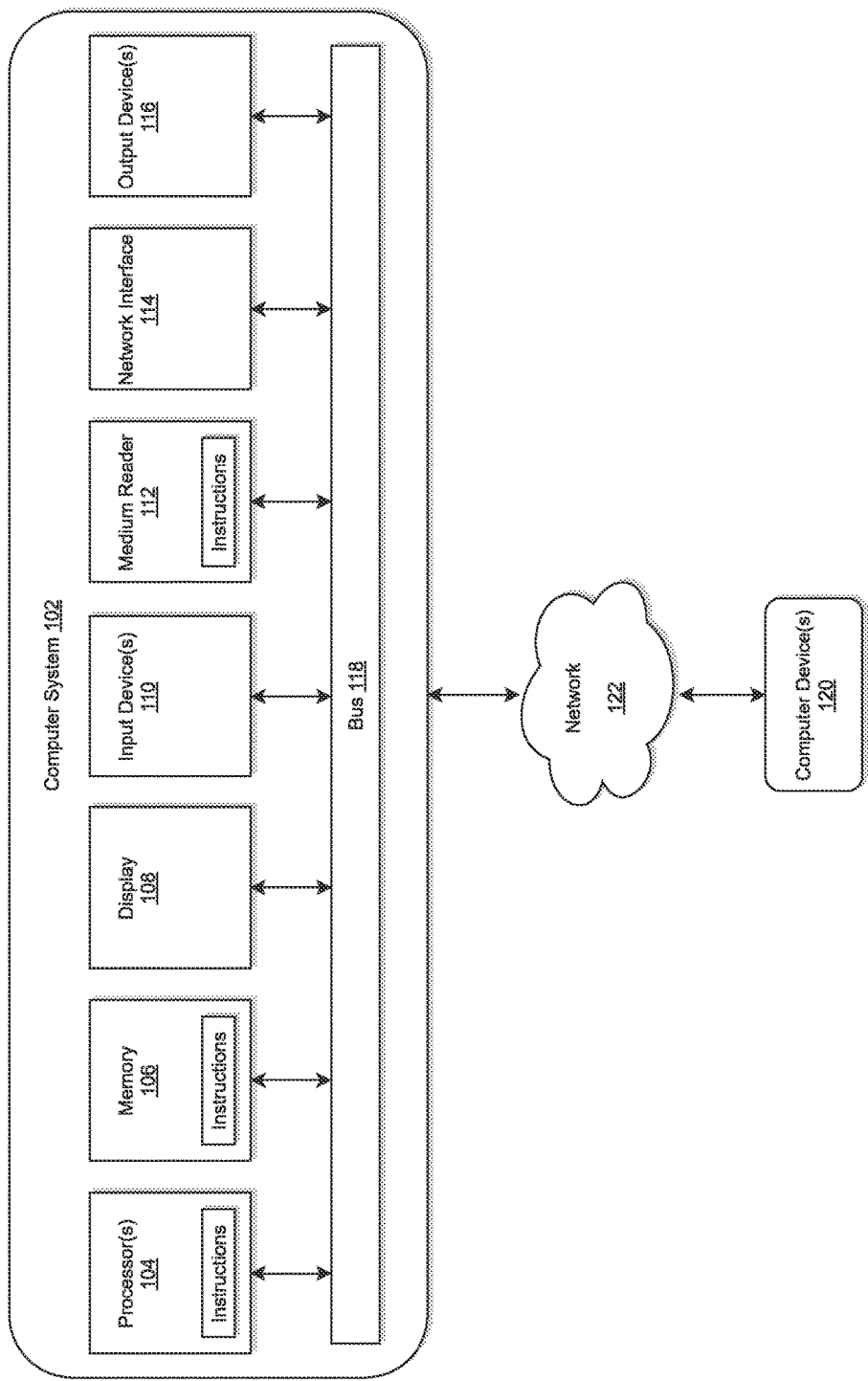
FIG. 1 illustrates a computer system for implementing a Global Data Validation Tool (GDVT) system in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 illustrates a computer system for implementing a Global Data Validation Tool (GDVT) system in accordance with an exemplary embodiment.

The system 100 is generally shown and may include a computer system 102, which is generally indicated. The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The network interface 114 may include, without limitation, a communication circuit, a transmitter or a receiver. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
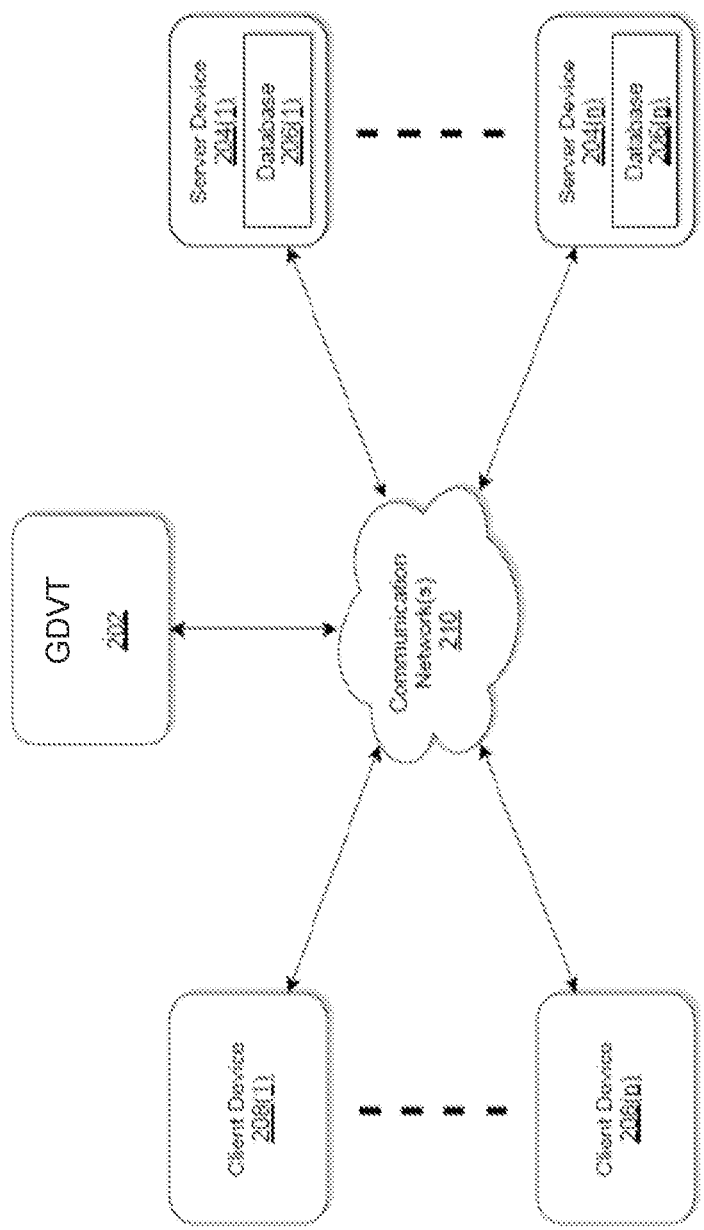
FIG. 2 illustrates an exemplary diagram of a network environment with a cloud native GDVT system in accordance with an exemplary embodiment.

FIG. 2 illustrates an exemplary diagram of a network environment with a cloud native GDVT system in accordance with an exemplary embodiment.

The GDVT system 202 may be the same or similar to the computer system 102 as described with respect to FIG. 1.

The GDVT system 202 may store one or more applications that can include executable instructions that, when executed by the GDVT system 202, cause the GDVT system 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the GDVT system 202 itself, may be located in virtual server(s) running in a cloud-based computing environment rather than being tied to one or more specific physical network computing devices. Also, the application(s) may be running in one or more virtual machines (VMs) executing on the GDVT system 202. Additionally, in one or more embodiments of this technology, virtual machine(s) running on the GDVT system 202 may be managed or supervised by a hypervisor.

In the network environment 200 of FIG. 2, the GDVT system 202 is coupled to a plurality of server devices 204(1)-204(n) that hosts a plurality of databases 206(1)-206(n), and also to a plurality of client devices 208(1)-208(n) via communication network(s) 210. A communication interface of the GDVT system 202, such as the network interface 114 of the computer system 102 of FIG. 1, operatively couples and communicates between the GDVT system 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the GDVT system 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The GDVT system 202 may be a standalone device or integrated with one or more other devices or apparatuses, such as one or more of the server devices 204(1)-204(n), for example. In one particular example, the GDVT system 202 may be hosted by one of the server devices 204(1)-204(n), and other arrangements are also possible. Moreover, one or more of the devices of the GDVT system 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the GDVT system 202 via the communication network(s) 210 according to the HTTP-based protocol and/or JavaScript Object Notation (JSON) protocol, for example, although other protocols may also be used. According to a further aspect of the present disclosure, wherein the user interface may be a Hypertext Transfer Protocol (HTTP) web interface, but the disclosure is not limited thereto.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the GDVT system 202 that may efficiently provide a platform for implementing a cloud native GDVT module, but the disclosure is not limited thereto.

The client devices 208(1)-208(n) may run interface applications, such as standard web browsers or standalone client applications, which may provide an interface to communicate with the GDVT system 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the GDVT system 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the GDVT system 202, the server devices 204(1)-204(n), or the client devices 208(1)-208(n), for example, may be configured to operate as virtual instances on the same physical machine. For example, one or more of the GDVT system 202, the server devices 204(1)-204(n), or the client devices 208(1)-208(n) may operate on the same physical device rather than as separate devices communicating through communication network(s) 210. Additionally, there may be more or fewer GDVT systems 202, server devices 204(1)-204(n), or client devices 208(1)-208(n) than illustrated in FIG. 2. According to exemplary embodiments, the GDVT system 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
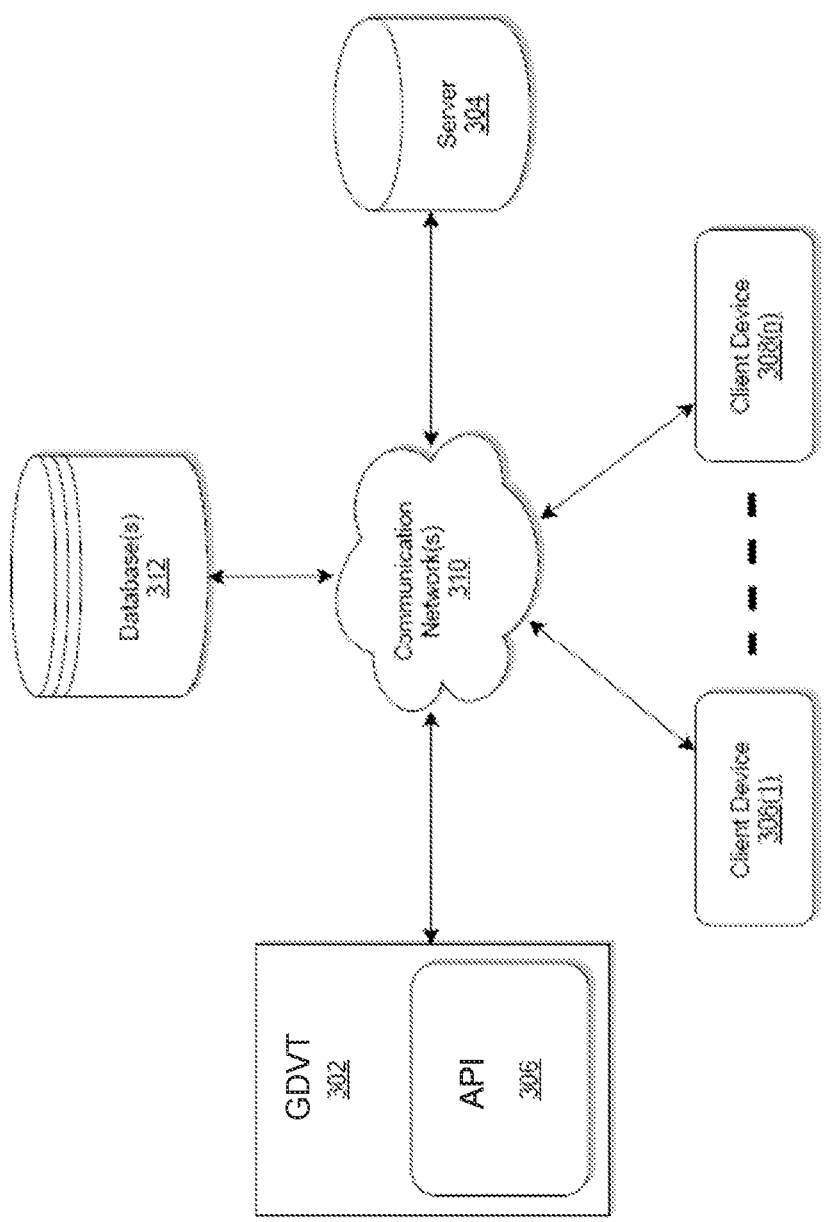
FIG. 3 illustrates a system diagram for implementing a cloud native GDVT system in accordance with an exemplary embodiment.

FIG. 3 illustrates a system diagram for implementing a cloud native GDVT system in accordance with an exemplary embodiment.

As illustrated in FIG. 3, the system 300 may include a Global Data Validation Tool (GDVT) system 302 within which a group of API modules 306 is embedded, a server 304, a database(s) 312, a plurality of client devices 308(1) . . . 308(n), and a communication network 310.

According to exemplary embodiments, the GDVT system 302 including the API modules 306 may be connected to the server 304, and the database(s) 312 via the communication network 310. Although there is only one database has been illustrated, the disclosure is not limited thereto. Any number of databases may be utilized. The GDVT System 302 may also be connected to the plurality of client devices 308(1) . . . 308(n) via the communication network 310, but the disclosure is not limited thereto.

According to exemplary embodiment, the GDVT system 302 is described and shown in FIG. 3 as including the API modules 306, although it may include other rules, policies, modules, databases, or applications, for example. According to exemplary embodiments, the database(s) 312 may be embedded within the GDVT system 302. According to exemplary embodiments, the database(s) 312 may be configured to store configuration details data corresponding to a desired data to be fetched from one or more data sources, user information data etc., but the disclosure is not limited thereto.

According to exemplary embodiments, the API modules 306 may be configured to receive real-time feed of data from the plurality of client devices 308(1) . . . 308(n) via the communication network 310.

According to exemplary embodiments, as will be described below, the API modules 306 may include, without limitation, request management API, automation template API, and execution API. The API modules 306 may provide a master catalog providing access to different APIs. In an example, upon authentication of a user, the API modules 306 may provide various automation request templates corresponding to an access setting of the user as specified in user profile.

The request management API may allow the user to create new automation requests, schedule the automation requests, association requests with existing automation templates, association requests with executions, search for automation requests, check status of an automation request, and trigger creation, submission, and completion notification.

The automation template API may fetch automation template inputs form attributes, retrieve automation template variables, retrieve automation template rules/formats attributes, CRUD (create, read, update and delete) for reference data, and the like.

The execution API may, without limitation, trigger data ingestion process, trigger automation processing (e.g., validation, transformation, calculation, and arrangement), trigger storage and/or transfer of resulting data and documents, and read/write logs.

The API modules 306 may be configured to implement a user interface (UI) platform that is configured to enable GDVT as a service for a desired data processing scheme. The UI platform may include an input interface layer and an output interface layer. The input interface layer may request preset input fields to be provided by a user in accordance with a selection of an automation template. The UI platform may receive user input, via the input interface layer, of configuration details data corresponding to a desired data to be fetched from one or more data sources. The user may specify, for example, data sources, parameters, destinations, rules, and the like. The UI platform may further fetch the desired data from said one or more data sources based on the configuration details data to be utilized for the desired data processing scheme, automatically implement a transformation algorithm on the desired data corresponding to the configuration details data and the desired data processing scheme to output a transformed data in a predefined format, and transmit, via the output interface layer, the transformed data to downstream applications or systems.

The plurality of client devices 308(1) . . . 308(n) are illustrated as being in communication with the GDVT system 302. In this regard, the plurality of client devices 308(1) . . . 308(n) may be "clients" of the GDVT system 302 and are described herein as such. Nevertheless, it is to be known and understood that the plurality of client devices 308(1) . . . 308(n) need not necessarily be "clients" of the GDVT system 302, or any entity described in association therewith herein. Any additional or alternative relationship may exist between either or both of the plurality of client devices 308(1) . . . 308(n) and the GDVT system 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the GDVT system 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The GDVT system 302 may be the same or similar to the GDVT system 202 as described with respect to FIG. 2, including any features or combination of features described with respect thereto.

Figure 4:
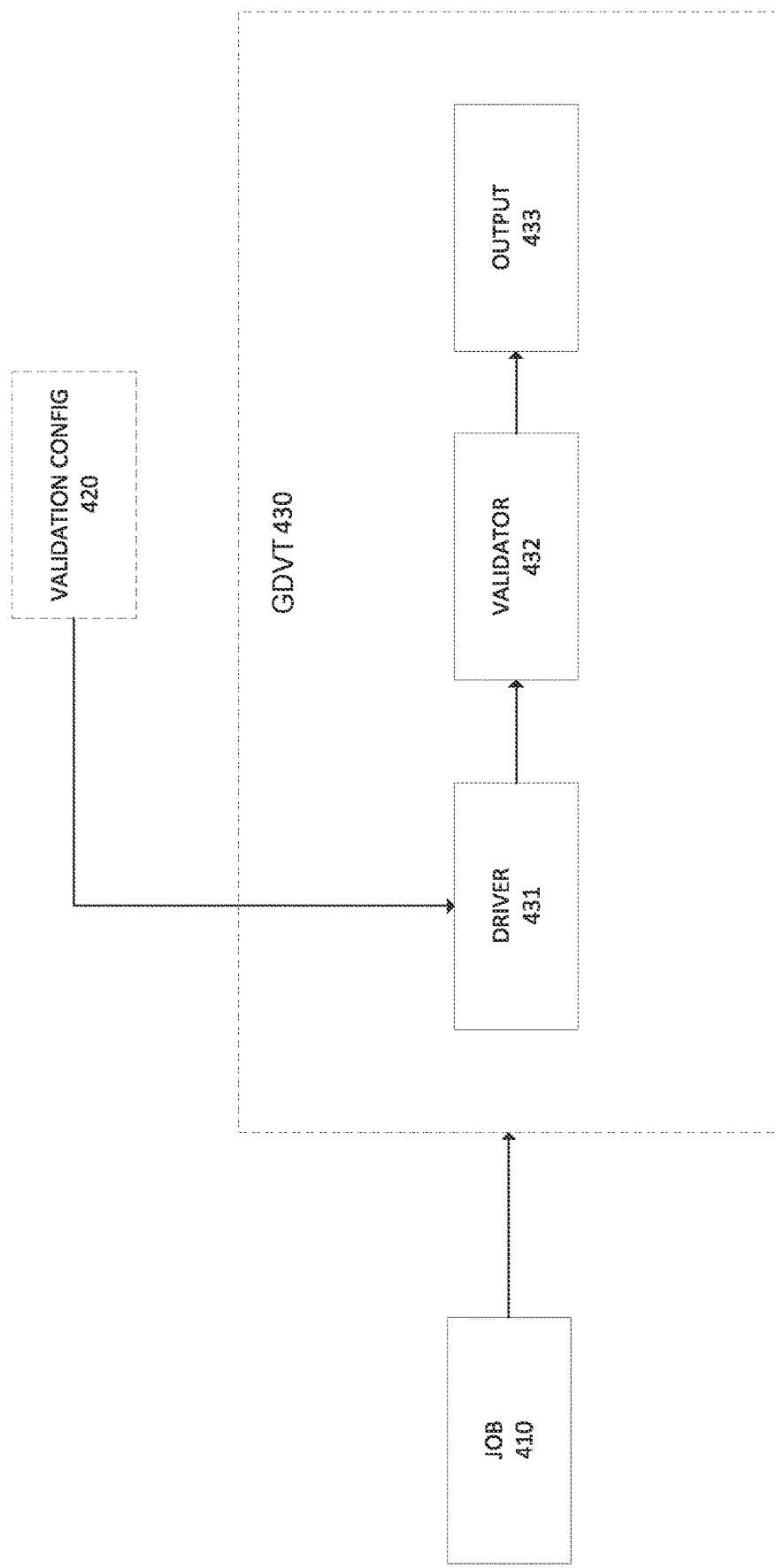
FIG. 4 illustrates a high level architecture of a GDVT system in accordance with an exemplary embodiment.

FIG. 4 illustrates a high level architecture of a GDVT system in accordance with an exemplary embodiment.

FIG. 4 includes three basic components, namely, a job 410, a validation configuration 420, and a GDVT system 430. The job 410 may refer to a job task, such as generating a forecasting report for a specific time period and for a particular team/organization. The job 410 or the job task may include a number of technical operations that may be required to be performed in order to provide an output specified by the job task. The technical operations may include various data manipulation operations. For example, the technical operations may include, without limitation, importing of data, filtering of data, grouping of data, ordering of data, aggregating of data, and other data manipulations. One or more of such technical operations may require verification and/or validations to be performed to ensure that a proper output is provided for the requested job 410.

The validation configuration 420 may be user configurable information or input data. In an example, the validation configuration 420 may be a user configurable JSON, which may drive a validation framework of the GDVT system 430. The validation configuration 420 may include information about input files to a framework on which validation is to be performed, and customizations for every validation. The validation configuration 420 may include additional options that may be specified, including an option to skip the validation operation for one or more technical operations included in the job task.

In an example, the validation configuration 420 may be an open standard file/data interchange format that utilize human readable text to store and transmit data objects. Further, the validation configuration 420 may include generic placeholders for input data, which may be automatically filled in once inputted to the GDVT system 430 or manually inputted by a user. Although aspects of the present disclosure are provided with respect to JSON as the validation configuration 420, aspects of the present application are not limited thereto, such that other data format or a user interfacing fillable form for inputting information may be utilized.

The GDVT system 430 may be a cloud network based validation framework. The GDVT system 430 includes a driver 431, a validator 432 and an output 433. Further, the GDVT system 430 may additionally include an optional customizable file, which may be leveraged if it is needed to perform certain specific or customized transformations on the data. The custom functions may be written by a user in the customizable file, and be provided against specific data on which to be applied in the validation configuration 420 (e.g., JSON). However, aspects of the present disclosure are not limited thereto, such that there may be a centralized library of modifiable files that may be utilized for performing more specific operations, such that minimal or no coding may be required. An output of the custom functions may be provided as a data frame or directly outputted. If the output is provided as the data frame, further processing may be performed on the data for the validation. Otherwise, the output is directly taken to perform validation.

The driver 431 may be a file that is leveraged to customize the validation configuration 420 inputted to the GDVT system 430. The driver 431 may be leveraged if the inputted information in the validation configuration 420 is variable based on a specific job task or for each run. The driver 431 may be a python file, although aspects of the present disclosure are not limited thereto.

The driver 431 may take the inputted information or JSON, and provide a customized JSON file to be provided to the validation 432 as a dictionary file. More specifically, the place holder information provided in the JSON may be automatically replaced or filled in by the driver 431 for customization.

The validator 432 may be a python file that is driven by the validation configuration 420 (e.g., JSON) inputted to the GDVT system 430. The validator 432 may include various functions that perform validations that are specified in the validation configuration 420 information inputted to the GDVT system 430.

The functions may include, without limitation, a file check validation, a drop check validation, a duplicate check validation or a custom validation. In an example, one or more validation functions may be selected for performance. The one or more validation functions may be manually set or specified in the validation configuration 420. If the validation function is not specified, the file check validation (or any other validation function) may be set as a default. In a further example, one or more validation functions may be automatically selected based on the information provided on the validation configuration 420. More specifically, one or more validation functions may be automatically selected by a machine learning algorithm or artificial intelligence based on a historical pattern of validation function selection. In an example, machine learning may refer to computer algorithms that may improve automatically through use of data. Machine learning algorithm may build an initial model based on sample or training data, which may be iteratively improved upon as additional data are acquired.

The file check validation function may check whether the inputted file is of a particular type, such as a csv or parquet file. Further, the file check validation function may check to determine whether the inputted file is corrupted.

The drop check validation function checks to determine if there is a drop in count for any column. Such check may be performed by comparing counts of more than one table. The inputs for the drop check validation function includes, without limitation, filter, groupby, orderby, and aggregate. The count may be performed in two ways, either by total count or distinct count based on the input provided in the validation configuration 420 (e.g., JSON). In addition, the drop check validation function may include a custom function section, which may return either dataframe or count. Based on whether the count is returned or the dataframe is returned, further operations may be performed.

The duplicate check validation function may perform a check to determine if there are any duplicates in a specified column for a table. Further, the duplicate check validation function may compare a count and distinct count for the columns in the table.

The custom check validation function may take a return or a result of the custom function and write it into the output file.

In a validation operation, the user may directly specify various validation functions to be performed. For example, data manipulation functions may include, without limitation, a filter, groupby, orderby, or an aggregate that is be performed on each table and the counts are retrieved accordingly for comparison.

Further, the user may also provide a custom function. After the validation function returns a dataframe that is modified by the custom function, user provided functions, such as filter, groupby, orderby, and aggregate may be performed.

In addition to the above, the user may specify a custom function which performs a custom validation using a generic tool. The generic tool may then call the custom function which may return a validation result, for which the validation result and the output are written to the validation report.

The validator 432 may generate an output 433. The output 433 may be a spreadsheet or csv file indicating a result of the one or more validation functions performed. The output 433 may include, without limitation, details containing about a status of a particular validation operation on the validation configuration 420 information, along with detailed description of the validation operation(s) performed.

Figure 5:
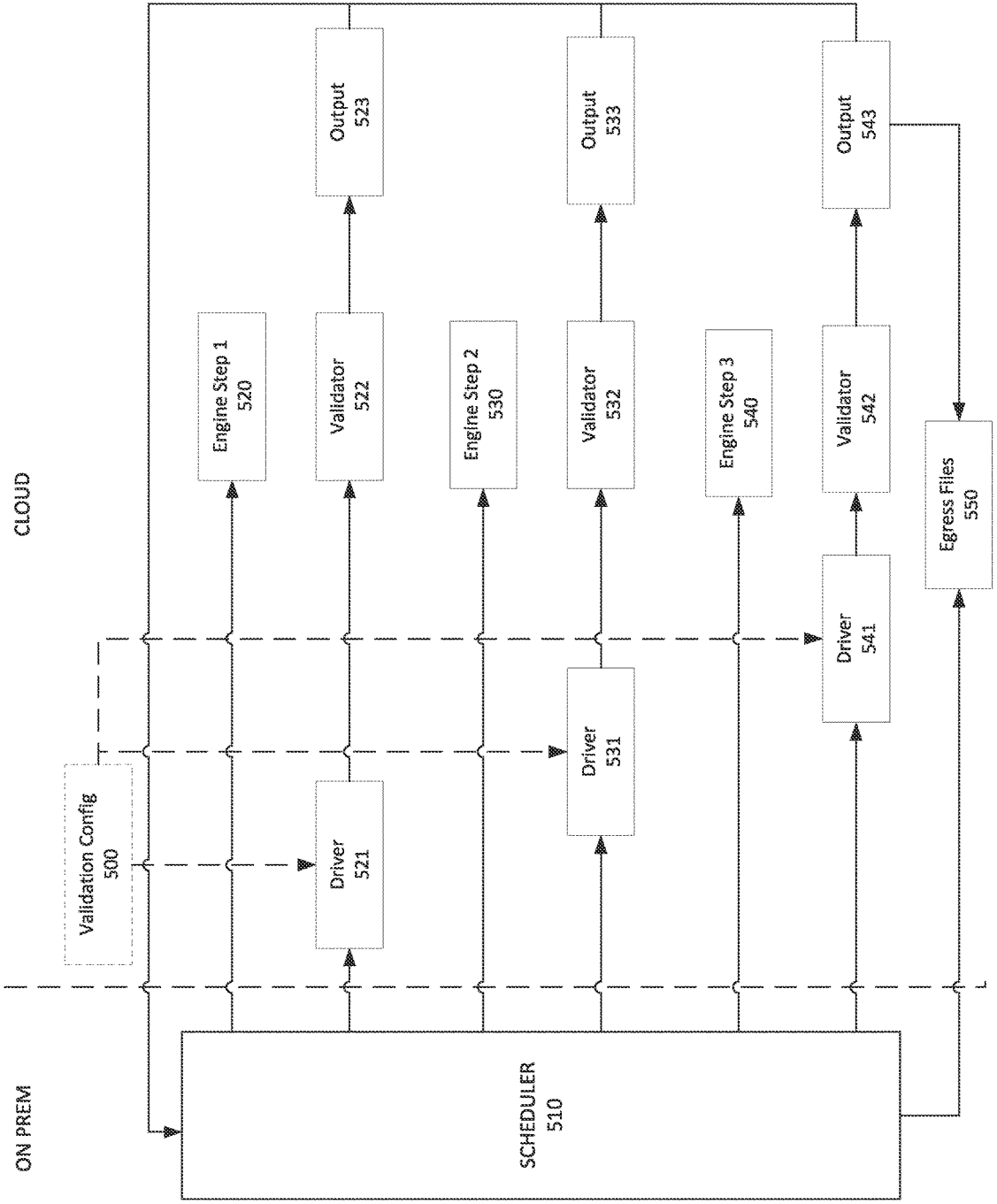
FIG. 5 illustrates a process flow of performing a job with a GDVT system in accordance with an exemplary embodiment.

FIG. 5 illustrates a process flow of performing a job with a GDVT system in accordance with an exemplary embodiment.

FIG. 5 illustrates an interaction between a scheduler 510 and a GDVT system. The scheduler may also be referred to as an orchestrator, and located locally or on premise. The GDVT system may reside on a cloud network. However, aspects of the present disclosure are not limited thereto, such that the scheduler 510 and GDVT system may both located on premise, or both on the cloud network.

In an example, the schedule 510 may receive a job task to be performed, and identify various technical operations (e.g., data manipulation) to be executed in order to complete performance of the job task. The identified technical operations corresponding to the job task may then be scheduled to be executed in a particular sequence. Further, based on the technical operations to be sequentially performed, a GDVT system may be set to be applied for one or more of the technical operations. In an example, one or more of the technical operations may be selected for the GDVT system to be applied. The selection may be manually inputted, or automatically configured based on the technical operations scheduled to be performed. The GDVT system may be centrally located and may be accessed for execution by various technical operations of one or more job tasks.

In an example, a job task selected for execution may include performance of Engine Step 1 (520), Engine Step 2 (530) and Engine Step 3 (540), which are to be performed in a sequential manner. Although three technical operations are illustrated as being performed, aspects of the present disclosure are not limited thereto, such that more or less technical operations may be performed for a job task. Further, although one technical operation is illustrated as being performed one at a time, multiple technical operations may be set to be performed contemporaneously.

Along with the job task to be performed, a corresponding validation configuration 500 information may be inputted to be performed for the job task specified. The validation configuration 500 information may specify one or more technical operations (e.g., Engine Step 1 (520), Engine Step 2 (530) and Engine Step 3 (540)) for which the GDVT system is to be applied. The validation configuration 500 information may include user configurable information. For example, the validation configuration 500 information may be provided as JSON. The validation configuration 500 information may include information about input files (e.g., Engine Step 1 (520), Engine Step 2 (530) and Engine Step 3 (540)) for which validation has to be performed.

As illustrated in FIG. 5, after the initial execution of Engine Step 1 (520) as scheduled by the scheduler 510, a validation configuration 500 for the Engine Step 1 (520) may be provided to driver 521 based on the user configured information with respect to the technical operations performed for the respective job task.

The validation configuration 500 may include user configured information specific to the Engine Step 1 (520). In an example, the validation configuration 500 information may be a user configurable JSON, which may drive the validation framework of the GDVT system. The driver 521, which may be centrally located, may generate a dictionary file based on the validation configuration 500 information provided for the Engine Step 1 (520). More specifically, the driver 521 may customize the validation configuration 500 inputted to the GDVT system for providing a customized input information (e.g., JSON) to be provided to validator 522. In an example, the input information specified for the Engine Step 1 (520) of the job task may include place holders, which may be modified or replaced with corresponding information by the driver 521 to generate a dictionary file for the Engine Step 1 (520).

The validator 522 in receipt of the dictionary file provided by the driver 521, may perform one or more validation functions. The validation functions may include, without limitation, a file check validation, a drop check validation, a duplicate check validation or a custom validation. In an example, one or more validation functions may be selected for performance. Validation functions or operations to be performed may be specified in user configurable input data as provided by the validation configuration 500 or automatically inputted by the driver 521 based on the technical operation to be performed. Further, if no validation function is selected for execution, then a default validation function may be automatically selected. In an example, the default validation function may be automatically selected by a machine learning algorithm or artificial intelligence based on a historical pattern of validation function selection or based on a combination of input data provided.

Upon execution of the one or more validation functions selected to be performed for the customized information (e.g., dictionary file), an output 523 is generated. The output 523 may be a spreadsheet or csv file indicating a result of the one or more validation functions performed. More specifically, the output 523 may include, without limitation, details containing about a status of a particular validation function or operation on the validation configuration 500 information, along with detailed description of the validation function(s) or operation(s) performed. The output 523 is then transmitted to the scheduler 510 located on premise. Also, the output 523 may be stored in a memory and may then be aggregated in an Egress files 550 for reporting.

Subsequently, the scheduler 510 executes a subsequent technical operation of the respective job task, Engine Step 2 (530). Upon execution of the Engine Step 2 (530) as scheduled by the scheduler 510, the validation configuration 500 for Engine Step 2 (530) may be provided to a driver 531 based on the user configured information with respect to the technical operations performed for the respective job task.

The validation configuration 500 may additionally include user configured information specific to the Engine Step 2 (530), if Engine Step 2 (530) is selected for performing validation by the GDVT system. In an example, the validation configuration 500 information may be a user configurable JSON, which may drive the validation framework. The driver 531, which may be centrally located, may generate a dictionary file based on the validation configuration 500 information provided for the Engine Step 2 (530). More specifically, the driver 531 may customize the validation configuration 500 inputted to the GDVT system for providing a customized input information (e.g., JSON) to be provided to validator 532. In an example, the input information specified for the Engine Step 2 (530) of the job task may include place holders, which may be modified or replaced with corresponding information by the driver 531 to generate a dictionary file for the Engine Step 2 (530).

The validator 532 in receipt of the dictionary file provided by the driver 531, may perform one or more validation functions. Validation functions or operations to be performed may be specified in user configurable input data as provided by the validation configuration 500 or automatically inputted by the driver 531 based on the technical operation to be performed. Further, if no validation function is selected for execution, then a default validation function may be automatically selected. In an example, the default validation function may be automatically selected by a machine learning algorithm or artificial intelligence based on a historical pattern of validation function selection or based on a combination of input data provided.

Upon execution of the one or more validation functions selected to be performed for the customized information (e.g., dictionary file), an output 533 is generated. The output 533 is then transmitted to the scheduler 510 located on premise. Also, the output 533 may be stored in a memory and may then be aggregated in an Egress files 550 for reporting.

Subsequently, the scheduler 510 executes a subsequent technical operation of the respective job task, Engine Step 3 (540). Upon execution of the Engine Step 3 (540) as scheduled by the scheduler 510, the validation configuration 500 for Engine Step 3 (540) may be provided to a driver 541 based on the user configured information with respect to the technical operations performed for the respective job task.

The validation configuration 500 may additionally include user configured information specific to the Engine Step 3 (540), if Engine Step 3 (540) is selected for performing validation by the GDVT system. If Engine Step 3 (540) is not selected for performing validation by the GDVT system, driver 541 and validator 542 may not be applied for Engine Step 3 (540) and output 543 may not be outputted or generated.

In an example, the validation configuration 500 information may be a user configurable JSON, which may drive the validation framework. The driver 541, which may be centrally located, may generate a dictionary file based on the validation configuration 500 information provided for the Engine Step 3 (540). More specifically, the driver 541 may customize the validation configuration 500 inputted to the GDVT system for providing a customized input information (e.g., JSON) to be provided to validator 542. In an example, the input information specified for the Engine Step 3 (540) of the job task may include place holders, which may be modified or replaced with corresponding information by the driver 541 to generate a dictionary file for the Engine Step 3 (540).

The validator 542 in receipt of the dictionary file provided by the driver 541, may perform one or more validation functions. Validation functions or operations to be performed may be specified in user configurable input data as provided by the validation configuration 500 or automatically inputted by the driver 541 based on the technical operation to be performed. Further, if no validation function is selected for execution, then a default validation function may be automatically selected. In an example, the default validation function may be automatically selected by a machine learning algorithm or artificial intelligence based on a historical pattern of validation function selection or based on a combination of input data provided.

Upon execution of the one or more validation functions selected to be performed for the customized information (e.g., dictionary file), an output 543 is generated. The output 543 is then transmitted to the scheduler 510 located on premise. Also, the output 543 may be stored in a memory and may then be aggregated in an Egress files 550 for reporting.

Although validation configuration 500 information is illustrated as providing input to each of driver 521, driver 531, and driver 541, aspects are not limited thereto, such that the validation configuration 500 information may provide input to one or more of the driver 521, driver 531, and driver 541 based on data provided by the user configured information inputted to the validation configuration 500 information.

Figure 6:
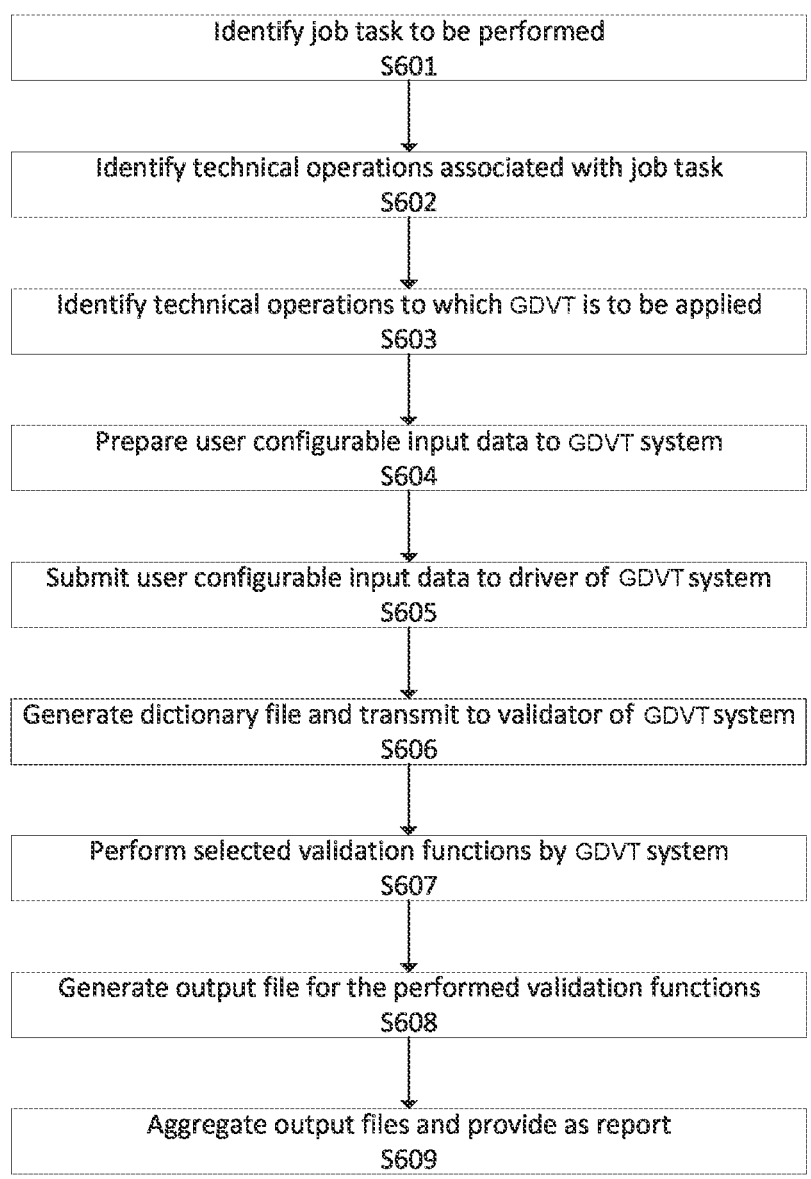
FIG. 6 illustrates a method for performing verification and validation using a GDVT system in accordance with an exemplary embodiment.

FIG. 6 illustrates a method for performing verification and validation using a GDVT system in accordance with an exemplary embodiment.

In operation S601, a job task to be performed in identified. The job task may include generating of a particular report (e.g., sales forecast report), or a task requested by an end user, which includes multiple data manipulation operations or technical operations.

In operation S602, technical operations associated with the job task are identified. The job task may include a number of technical operations to be performed, some of which may require one or more validations to be performed.

In operation S603, one or more technical operations to which GDVT system is to be applied are identified. In an example, GDVT system may be centrally located within a cloud network, such that GDVT system may be leveraged by multiple technical operations of the same or different job tasks.

In operation S604, user configurable input data is prepared for submission to the GDVT system as validation configuration information. In an example, the validation configuration information may reside on a cloud network, and may specify one or more technical operations to which the GDVT system is to be applied. The user configurable input data may be provided as JSON or comparable coding language. However, aspects of the present disclosure are not limited thereto, such that the use configuration data may be specified as a web-based input form, which may include fillable information, requiring little to no coding skills by a user. The user configurable input data may include user specified data to be applied to one or more technical operations, and may additionally include placeholders for one or more input fields.

In operation S605, the user configurable input data is submitted to a driver of the GDVT system as the validation configuration information for the respective job task. The driver of the GDVT system receives the validation configuration information, and prepares a customized dictionary file for validation by a validator of the GDVT system. More specifically, the driver may receive the validation configuration information and replace one or more place holders included in the validation configuration information with information corresponding to the respective technical operation to be performed to create a dictionary file. The dictionary file may also specify one or more validation operations to be performed. In an example, validation operations to be performed on the dictionary file may be specified in the user configurable input data or automatically inputted by the driver based on the technical operation to be performed. Further, if no validation function is selected for execution, then a default validation function may be automatically selected. In an example, the default validation function may be automatically selected by a machine learning algorithm or artificial intelligence based on a historical pattern of validation function selection or based on a combination of input data provided.

In operation S606, the dictionary file generated by the driver of the GDVT system is transmitted to the validator of the GDVT system. The validator of the GDVT system may determine one or more validation functions to be performed.

In operation S607, the validator of the GDVT system then performs the selected validation functions.

In operation S608, the validator of the GDVT system generates an output file for the respective technical operation.

In operation S609, output files for the validated technical operations of the job task may be aggregated and provided to the user as a report. In an example, the report may specify the technical operations for which the GDVT system was applied, validation functions selected for performance, and results of the selected validation functions.

FIG. 7 illustrates a validation report generated by a GDVT system in accordance with an exemplary embodiment.

As illustrated in FIG. 7, the validation report may include information with respect to an Engine Step or a technical operation included in a job task, for which a validation function operation is performed by the GDVT system. FIG. 7 illustrates that validation functions were performed for Engine Step 1, Engine Step 2, and Engine Step 3. However, aspects of the present disclosure are not limited thereto, such that validation functions may be performed on less Engine Steps included in a respective job task.

For each of the Engine Steps, validation function type performed by the GDVT system may be identified. In an example, validation function types may include, without limitation, a file check validation, a drop check validation, a duplicate check validation or a custom validation. In an example, one or multiple validation functions of different types may be performed for a single technical operation.

Further, status for each of the validation functions performed may also be indicated. Indications may include "Success" and "Fail". However, aspects of the present disclosure are not limited thereto, such that other statuses or indications may be added thereto if necessary.

All of the validation functions are included in the same file, but modifications may be made to obtain different validations in different files. Also, a partially aggregated report including results of all of the validations performed for a particular validation function type may also be provided. Further, a master report for all of the validations performed for the Engine Steps of a respective job task may also be provided. In an example, such reports may be provided as a csv file or a parquet file.

Further, although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for selectively performing a validation of one or more technical operations by a cloud network based validation framework, the method comprising:

identifying, by a processor, a job task to be performed;

identifying, by the processor and from the job task, a plurality of technical operations included in the job task, wherein the plurality of technical operations are required for generating an output specified by the job task;

receiving, at the cloud network based validation framework and from the processor, user configurable input data that specifies selective performance of validation on a first set of the plurality of technical operations, while also specifying selective non-performance of validation on a second set of the plurality of technical operations and specifying a default validation for any remaining operation among the plurality of technical operations;

customizing, using the received user configurable input data and by a driver of the cloud network based validation framework, a data file including placeholder information;

executing, by the processor, in sequence, each of the plurality of technical operations;

generating, by the driver of the cloud network based validation framework and for each of the plurality of technical operations, a dictionary file based on the customized data file, wherein the placeholder information included in the customized data file is automatically replaced or filled by the driver for the generating of the dictionary file, wherein the dictionary file specifies at least one function to be applied among a plurality of functions stored at the cloud network based validation framework, wherein the at least one function to be applied specified by the dictionary file is based on the user configurable input data or the placeholder information, and wherein a first dictionary file is generated after execution of a first technical operation but before execution of a second technical operation;

determining, by the cloud network based validation framework, a validation function as the at least one function to be applied to the at least one of the plurality of technical operations included in the job task;

driving, by the cloud network based validation framework, the determined validation function on the at least one of the plurality of technical operations included in the job task; and performing, by the cloud network based validation framework, the determined validation function on the at least one of the plurality of technical operations included in the job task for determining a validity of the at least one of the plurality of technical operations included in the job task; and generating, by the cloud network based validation framework, a plurality of validation reports, each of the plurality of validation reports indicating a validation report type corresponding to a validation function performed and a technical operation for which the validation function was performed.

2. The method according to claim 1, further comprising:
generating an output file of the validation function performed for the at least one of the plurality of technical operations.

3. The method according to claim 2, wherein the output file is either in a csv format or a parquet format.

4. The method according to claim 1, wherein the user configurable input data is provided as JSON.

5. The method according to claim 1, wherein the user configurable input data is modified by the cloud network based validation framework, when submitted to the cloud network based validation framework.

6. The method according to claim 1, wherein the validation function includes at least one of a file check validation, a drop check validation, a duplicate check validation or a custom validation.

7. The method according to claim 1, wherein the cloud network based validation framework includes the driver, a validator, and an output file.

8. The method according to claim 1, wherein the user configurable input data is received from a web-based input form.

9. The method according to claim 1, wherein a sequence of the plurality of technical operations and corresponding validations are orchestrated by an on premise scheduler.

10. The method according to claim 1, wherein the cloud network based validation framework is contemporaneously accessible by different technical operations of different job tasks.

11. The method according to claim 1, wherein a file check validation is specified as the validation function as a default unless specified otherwise by the dictionary file.

12. The method according to claim 1, wherein the validation function specified in the dictionary file is automatically selected by artificial intelligence.

13. A system, comprising:
a processor;
a memory; and
a communication circuit,
wherein the processor is configured to:
identify a job task to be performed;
identify, from the job task, a plurality of technical operations included in the job task, wherein the plurality of technical operations are required for generating an output specified by the job task;
receive, at a cloud network based validation framework, user configurable input data that specifies selective performance of validation of a first set of the plurality of technical operations, while also specifying selective non-performance of validation of a second set of the plurality of technical operations and specifying a default validation for any remaining operation among the plurality of technical operations;
customize, using the received user configurable input data and by a driver of the cloud network based validation framework, a data file including placeholder information;

execute, in sequence, each of the plurality of technical operations;
generate, via the driver of the cloud network based validation framework and for each of the plurality of technical operations, a dictionary file based on the customized data file, wherein the placeholder information included in the customized data file is automatically replaced or filled by the driver for the generating of the dictionary file, wherein the dictionary file specifies at least one function to be applied among a plurality of functions stored at the cloud network based validation framework, wherein the at least one function to be applied specified by the dictionary file is based on the user configurable input data or the placeholder information, and wherein a first dictionary file is generated after execution of a first technical operation but before execution of a second technical operation;
determine, via the cloud network based validation framework, a validation function as the at least one function to be applied to the at least one of the plurality of technical operations included in the job task;
drive, via the cloud network based validation framework, the determined validation function on the at least one of the plurality of technical operations included in the job task; and
perform, via the cloud network based validation framework, the determined validation function on the at least one of the plurality of technical operations included in the job task for determining a validity of the at least one of the plurality of technical operations included in the job task; and
generate, via the cloud network based validation framework, a plurality of validation reports, each of the plurality of validation reports indicating a validation report type corresponding to a validation function performed and a technical operation for which the validation function was performed.

14. A non-transitory computer readable storage medium that stores a computer program for selectively performing a validation of one or more technical operations by a cloud network based validation framework, the computer program, when executed by a processor, causing a system to perform a process comprising:
identifying a job task to be performed;
identifying, from the job task, a plurality of technical operations included in the job task, wherein the plurality of technical operations are required for generating an output specified by the job task;
receiving, at the cloud based validation framework, user configurable input data that specifies selective performance of validation on a first set of the plurality of technical operations, while also specifying selective non-performance of validation on a second set of the plurality of technical operations and specifying a default validation for any remaining operation among the plurality of technical operations;
customizing, using the received user configurable input data and by a driver of the cloud network based validation framework, a data file including placeholder information;
executing, in sequence, each of the plurality of technical operations;
generating, by the driver of the cloud network based validation framework and for each of the plurality of technical operations, a dictionary file based on the customized data file, wherein the placeholder information included in the customized data file is automatically replaced or filled by the driver for the generating of the dictionary file, wherein the dictionary file specifies at least one function to be applied among a plurality of functions stored at the cloud network based validation framework, wherein the at least one function to be applied specified by the dictionary file is based on the user configurable input data or the placeholder information, and wherein a first dictionary file is generated after execution of a first technical operation but before execution of a second technical operation;

determining, by the cloud network based validation framework, a validation function as the at least one function to be applied to the at least one of the plurality of technical operations included in the job task;

driving, by the cloud network based validation framework, the determined validation function on the at least one of the plurality of technical operations included in the job task; and performing, by the cloud network based validation framework, the determined validation function on the at least one of the plurality of technical operations included in the job task for determining a validity of the at least one of the plurality of technical operations included in the job task; and generating, by the cloud network based validation framework, a plurality of validation reports, each of the plurality of validation reports indicating a validation report type corresponding to a validation function performed and a technical operation for which the validation function was performed.

\* \* \* \* \*